Aug. 9, 1938.  E. C. HORTON  2,126,637
WINDSHIELD CLEANER
Filed Aug. 12, 1935
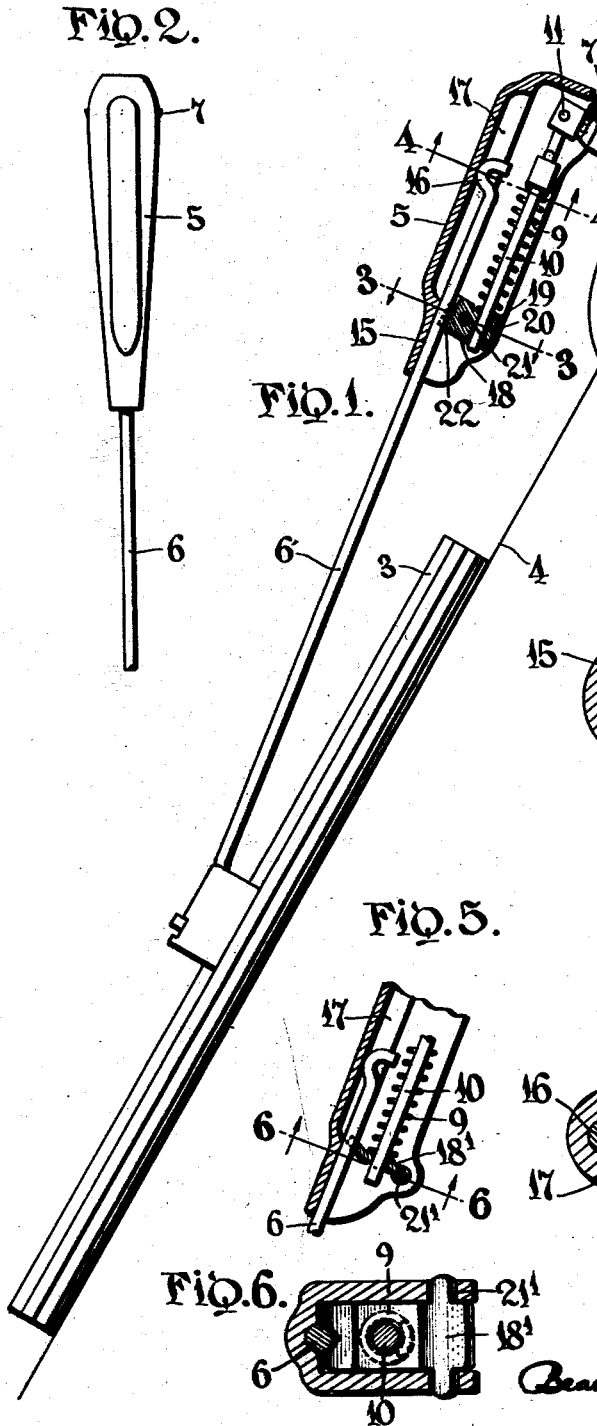
INVENTOR
Erwin C. Horton,
BY
Bean, Brooks, Buckley & Bean
ATTORNEYS Patented Aug. 9, 1938

2,126,637

UNITED STATES PATENT OFFICE 2,126,637

WINDSHIELD CLEANER

Erwin C. Horton, Hamburg, N. Y., assignor to Trico Products Corporation, Buffalo, N. Y.

Application August 12, 1935, Serial No. 35,851

8 Claims. (Cl. 15—255)

This invention relates to a window cleaner for motor vehicles, and particularly to the wiper or blade carrying arm.

The windows or windshields of motor vehicles vary in size, some being much smaller in dimension than others, and heretofore it has been customary to provide different styles and lengths of arms and wipers to adapt the windshield cleaner to the particular window. Attempts have been made to provide an adjustable wiper arm but the embodiments have been cumbersome and impractical.

The present invention has for its object to provide a wiper carrying arm for windshield cleaners which may readily be adjusted to suit the requirements of the particular car in a practical and efficient manner.

The invention further resides in the novel combinations and arrangements of parts which are hereinafter described, by which a peculiar cooperation is effected to permit of and secure the desired adjustment. For a fuller understanding of the invention reference is now made to the drawing, wherein Fig. 1 is a fragmentary view of a windshield equipped with a cleaner embodying the present invention in one form, portions of the wiper carrying arm being in section for the sake of clarity;

Fig. 2 is a front elevational view of the wiper carrying arm in part;

Figs. 3 and 4 are transverse sectional views taken respectively along lines 3—3 and 4—4 of Fig. 1;

Fig. 5 is a fragmentary sectional view through a modified form of the invention.

Fig. 6 is a transverse sectional view through such modified embodiment; and

Fig. 7 is a fragmentary sectional view of a further embodiment of the invention.

Referring more particularly to the drawing, numeral 1 designates an actuating shaft depicted as being journaled in the header construction 2 of a motor vehicle and carrying on its outer end the wiper carrying arm embodying one form of the present invention. To the outer end of the arm is attached a wiper or blade 3 which is moved thereby on the window 4.

The wiper carrying arm comprises an inner section 5, connectible to the shaft 1, and an outer section 6 to which the wiper 3 is attached. The inner arm section may be formed of a casting or stamping and hollowed to receive the adjacent end of the shaft. It is provided with a bearing part, such as the trunnioned saddle 7, by which the arm is given pivotal support on the shaft for movement of the wiper in a plane perpendicular to the window. The bearing part 7 is engaged in a seat 8 and retained therein by a spring 9 acting in opposition thereto. The spring is mounted on a connector rod 10 which extends radially from the shaft and is provided with a transverse pintle 11 engaging in a diametrical opening in said shaft. This provides a pivotal connection between the arm and shaft as well as a positive driving connection by which the arm may be oscillated with the shaft. The spring 9 may be anchored at one end and have its opposite end exert pressure against the shaft for holding the part 7 engaged with its seat. A construction of this design is disclosed in Patent No. 1,956,516 granted April 24, 1934 to Henry Hueber and myself.

According to the present disclosure, the inner arm section is provided with a guideway or groove 15 for slidably receiving the shank of the outer arm section 6, and the inner extremity of such outer arm section is provided with a key fitting in a keyway 17 of the companion arm section to hold the outer arm section against relative rotational movement but permitting in and out adjustment thereof. The two arm sections are secured in a set or adjusted position by releasable means which may assume different forms and preferably provide for a resilient clutching action. Such means, according to the general disclosure herein, embodies a wedge lock acting under a yielding pressure to clutch the shank of the inner section and secure it firmly, yet adapted to permit either telescoping or extending one section with respect to the other.

In Fig. 1, the wedge lock consists of a clutch member 18 which acts between a fixed part 21 of the inner arm section and the shank of the outer section. The clutch member is here pivoted on the pin 21 and wedges between the latter and the shank 6 when functioning. The clutch member is urged into clutch engagement with the arm section 6 by yieldable means, such as a spring. Preferably this spring is common to the arm mounting attachment and, therefore, the spring 9 will serve dually. As illustrated, the spring may engage the seat 19 of the clutch member, and the latter is provided with an opening 20 to permit the connector rod 10 to play therein as the arm pivots on the shaft. Where the clutch part is pivotally mounted, and the shank engagement by such part direct, the spring will tend to rotate the clutch to bring its biting or active edge 22 into firm engagement with the outer arm section for locking the two sections in the desired working position. Such working position may be determined at the time when the arm is assembled on the shaft or it may be selected by the motorist to suit his taste.

In the form of the invention depicted in Fig. 1, the fulcrum point for the clutch member is intermediate the point of clutching engagement and the point of application of the spring force. In the embodiment illustrated in Figs. 5 and 6, a lever arrangement of the third order is utilized wherein the spring force is applied to the clutching element intermediate its fulcrum mounting and the clutching engagement. In this second embodiment the clutching element 18' is stamped from sheet metal and mounted by trunnions in bearings 21' to wedge between the latter and the shank 6.

Or, the wedge lock may embody a slidable clutch member 18", as shown in Fig. 7, which wedges between the fixed bearing 21" and the shank of the outer arm section 6". In this embodiment the clutch member may assume a tapering or wedge shape and be apertured to slidably receive the connector rod 10. The spring 9 will seat on the clutch member, and these two parts may be assembled with the rod into a unit, as by peening over the protruding end of the rod.

From the foregoing it will be apparent that the arm sections may be readily adjusted. The outer arm section is extended simply by withdrawing the same from beneath the yieldable clutching element. Likewise, for shortening the effective length of the arm, the outer section is telescoped in the inner section. The clutching element provides a sufficient frictional embrace with the outer arm section to firmly secure the same against riding outwardly or inwardly with respect to the inner arm section so that for any given adjustment the two arm sections are firmly joined together. The connector rod 10 serves to guide and steady the clutch member in its movement. The biting edge of the clutching element, whether the edge 22 or the edge as the base of the tapered wedge, increases the friction. Complete withdrawal of the shank is prevented by the key 16.

It will be understood that the embodiments described and shown herein are merely illustrative of the inventive principles involved, which may be applied to other physical embodiments without departing from the scope and spirit of the invention claimed.

What is claimed is:

1. A windshield wiper arm having an inner section adapted to be attached to a wiper actuating shaft and an outer rod-like section slidable in a seat on the inner arm section to vary the effective length of the arm, said inner section being provided with a key-way inwardly from the seat and extending lengthwise of the arm and the outer section being provided with a key part engaging in the key-way to secure the arm sections against relative rotation, and a spring operated clutch carried by the inner arm section for resilient engagement with the outer section to secure the outer section in the seat and hold the two arm sections at a predetermined adjustment.

2. A window cleaner having a wiper, a supporting arm therefor, an actuating shaft on which the arm is detachably pivoted for movement toward a window surface, a connector member pivotally connected to the shaft and connecting the latter to the arm for movement as a unit with the arm upon oscillation of the shaft, a spring acting on the arm and shaft to secure the detachable connection between the arm and shaft, said arm having relatively extensible sections and means for securing the arm sections together, said spring acting also on said securing means to resiliently hold the latter operative.

3. A window cleaner having a wiper, a supporting arm therefor, an actuating shaft on which the arm is detachably pivoted for movement toward a window surface, a connector member pivotally connected to the shaft and connecting the latter to the arm for movement as a unit with the arm upon oscillation of the shaft, a spring acting on the arm and shaft to secure the detachable connection between the arm and shaft to press the wiper firmly in wiping contact therewith, said arm having relatively extensible sections, and means adapted to be spring pressed for securing the arm sections in fixed relation to each other, said securing means slidably engaging said connector member, and said spring acting on said securing means to render it operative and through the latter on the arm to urge the wiper toward the window surface.

4. A window cleaner having a wiper, an actuating shaft therefor, an arm connecting the wiper to the shaft, said arm having a section detachably mounted on the shaft and another section carrying the wiper and slidable on the first section for adjusting the effective length of the arm, a part movable to clutch the arm sections together, and spring means interposed between said part and the shaft and pressing said part into operative clutching position and secondarily holding said shaft and arm section yieldably together.

5. A window cleaner having a wiper, an actuating shaft therefor, an arm connecting the wiper to the shaft, said arm having a section detachably mounted on the shaft and another section carrying the wiper and adjustable on the first section for adjusting the effective length of the arm, a part movable to clutch the arm sections together, and a spring means acting in opposite directions on said shaft and said clutch part for holding the latter operative and securing the detachable mounting of the arm on the shaft.

6. A windshield cleaner having a wiper, a supporting arm therefor, an actuating shaft, means detachably connecting the shaft and arm, a spring for securing the detachable connection, the arm having relatively extensible sections for varying the effective length thereof, and a clutch for securing the sections in a definite relation to each other, said clutch being movably carried by one arm section and engaging the companion arm section, said spring yieldably pressing said clutch to its operative position.

7. A windshield cleaner having a wiper, an actuating shaft therefor, a supporting arm for the wiper engaged at one end therewith and having its opposite end detachably engaged with the shaft, said arm comprising relatively extensible sections for varying its effective length, means for coupling the arm sections together, and spring means supported by the shaft and acting on said coupling means to hold it operative and exerting an opposing force between the arm and shaft to secure the detachable engagement of the arm with the shaft.

8. A wiper carrying arm for a windshield cleaner having an actuating shaft, said arm comprising an inner section detachably engageable with the actuating shaft, an outer section slidably connected to the inner section for adjustment, and means for providing a driving connection between said shaft and said inner section, said connection means adapted for bearing on the shaft and including a part detachably engageable with the outer section for securing the adjustment between said sections, and spring means acting resiliently in one direction on said part for holding the latter operative, said spring means exerting pressure in the opposite direction through said connection means for holding said inner section detachably engaged with said shaft.

ERWIN C. HORTON.